United States Patent [19]

Nonaka

[11] Patent Number: 5,172,666
[45] Date of Patent: Dec. 22, 1992

[54] FUEL INJECTION CONTROL SYSTEM

[75] Inventor: Kimihiro Nonaka, Hamamatsu, Japan

[73] Assignee: Yamaha Hatsudoki Kabushiki Kaisha, Iwata, Japan

[21] Appl. No.: 791,219

[22] Filed: Nov. 13, 1991

[30] Foreign Application Priority Data

Nov. 13, 1990 [JP]  Japan ................................. 2-303836

[51] Int. Cl.$^5$ ............................................. F02D 43/00
[52] U.S. Cl. .................................... 123/352; 123/339; 123/418
[58] Field of Search ...................... 123/73 C, 305, 339, 123/352, 418, 501; 364/431.07

[56] References Cited

U.S. PATENT DOCUMENTS

| | | | |
|---|---|---|---|
| 4,509,478 | 4/1985 | Ament et al. | 123/339 |
| 4,541,052 | 9/1985 | McCulloch | 364/431.07 |
| 4,884,540 | 12/1989 | Kishimoto et al. | 123/418 X |
| 4,955,341 | 9/1990 | Trombley et al. | 123/339 |
| 5,095,873 | 3/1992 | Motoyama et al. | 123/339 X |

FOREIGN PATENT DOCUMENTS 2-252968  5/1990  Japan .

*Primary Examiner*—Tony M. Argenbright
*Attorney, Agent, or Firm*—Kenyon & Kenyon

[57] ABSTRACT

An apparatus for controlling the speed of a direct fuel injected, scavenged, two-stroke engine comprises a first sensor for sensing the degree to which the throttle is open, means for sensing whether the intake air amount is in the air-excess range, means for sensing whether the degree to whcih the throttle is open has been substantially constant for a predetermined amount of time, a sensor for sensing the engine revolution speed, means for producing a desired engine revolution speed based on the degree to which the throttle is open, and means for producing a signal coresponding to the difference between the engine revolution speed and the desired engine speed, when the degree to which the throttle is open has been substantially constant for the predetermined amount of time. A control device adjusts an engine running parameter based on this difference, to reduce this difference.

18 Claims, 7 Drawing Sheets

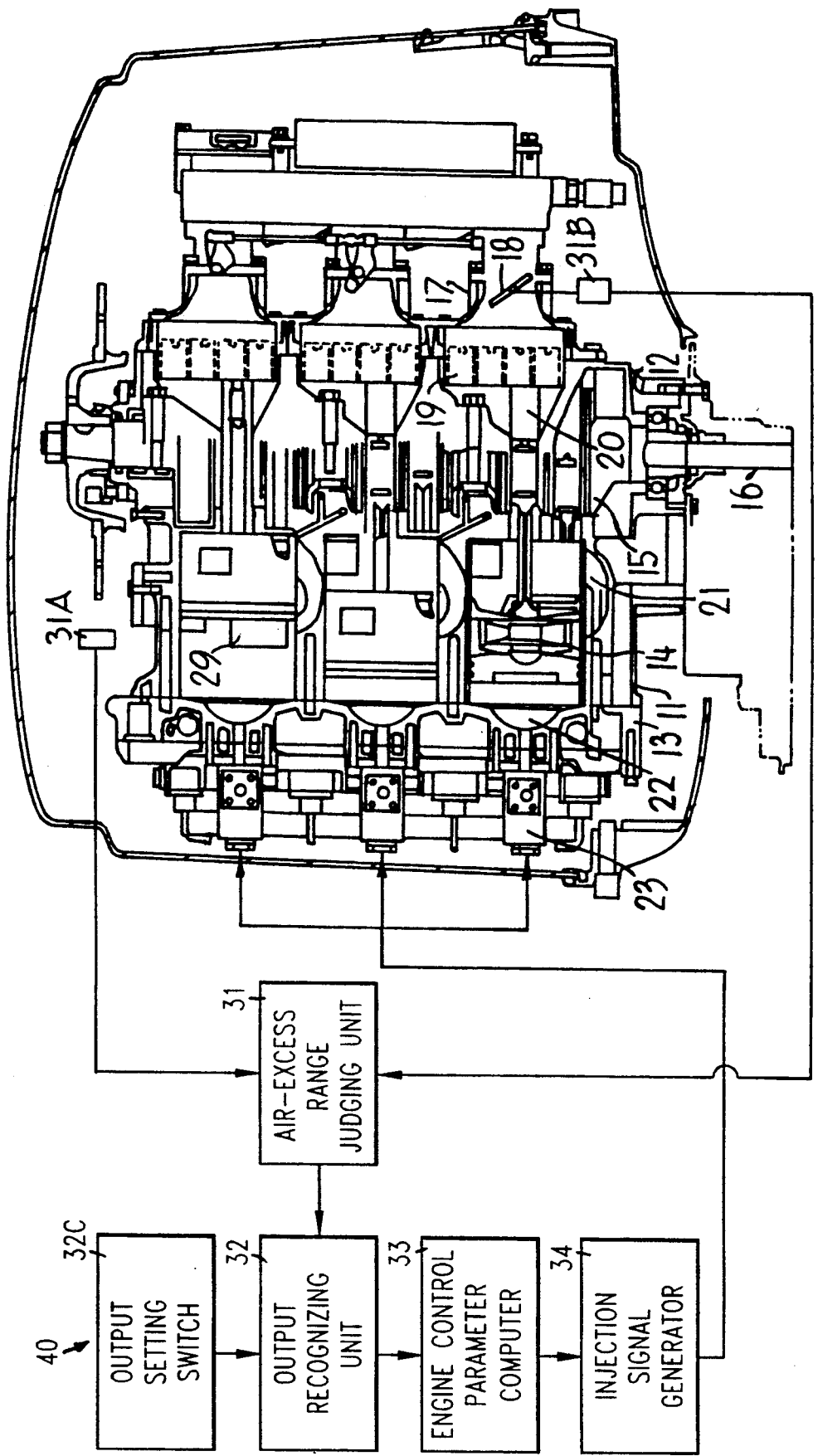

FUEL INJECTION CONTROL SYSTEM

BACKGROUND OF THE INVENTION

This invention relates to fuel control systems, particularly to fuel injection systems for 2-cycle, internal combustion engines.

Waves and water level fluctuations cause the load on the propulsion system of a boat to vary. This variation may be significant when the boat is trolling or even while the boat is idling. This in turn causes the engine speed to rise in fall. This variation in engine speed causes irregular combustion, fuel wastage, and may cause the engine to stall.

Japanese Unexamined Patent Publication Heil-294936 discloses a fuel injection control system for the 2-cycle engine in which air is supplied to the combustion chamber through an intake passage while fuel is injected directly into the combustion chamber mixed with air.

As the engine load is varied by waves or water level fluctuations while the boat is running with the throttle opening kept fixed, the engine revolution speed also varies and the passengers may feel unpleasant. To stabilize the engine revolution speed of a crank case scavenged, two stroke engine, prior fuel injection control systems have adjusted the intake air amount by adjusting the throttle opening, and the intake passage cross-sectional area.

However, this requires the installation of actuators for adjusting the throttle opening, and the intake passage cross-sectional area, to stabilize the engine revolution speed by adjusting the intake air amount. The performance of these systems may deteriorate over time due to salt damage to the actuators.

Thus there was felt a need for an engine speed regulating system which would effectively reduce engine speed variation without requiring the installation of additional actuators.

SUMMARY OF THE INVENTION

The present invention is directed to an apparatus for controlling the speed of revolution of a direct fuel injected, scavenged, two-stroke engine, comprising a first sensor for sensing the degree to which the throttle is open, means for sensing whether the intake air amount is in the air-excess range and means coupled to the first means for sensing whether the degree to which the throttle is open has been substantially constant for a predetermined amount of time. The apparatus further includes a second sensor for sensing the engine revolution speed and means for producing a desired engine revolution speed based on the degree to which the throttle is open. When the degree to which the throttle is open has been substantially constant for the predetermined time the engine revolution speed is compared to the desired engine revolution speed means and a signal corresponding to the difference between the engine revolution speed and said desired engine speed is produced. A control device adjusts at least one engine running parameter based on this difference in order to reduce this difference.

BRIEF DESCRIPTION OF THE DRAWINGS

FIG. 6 shows an outboard motor according to a second embodiment of the present invention.

DETAILED DESCRIPTION

Figure 1:
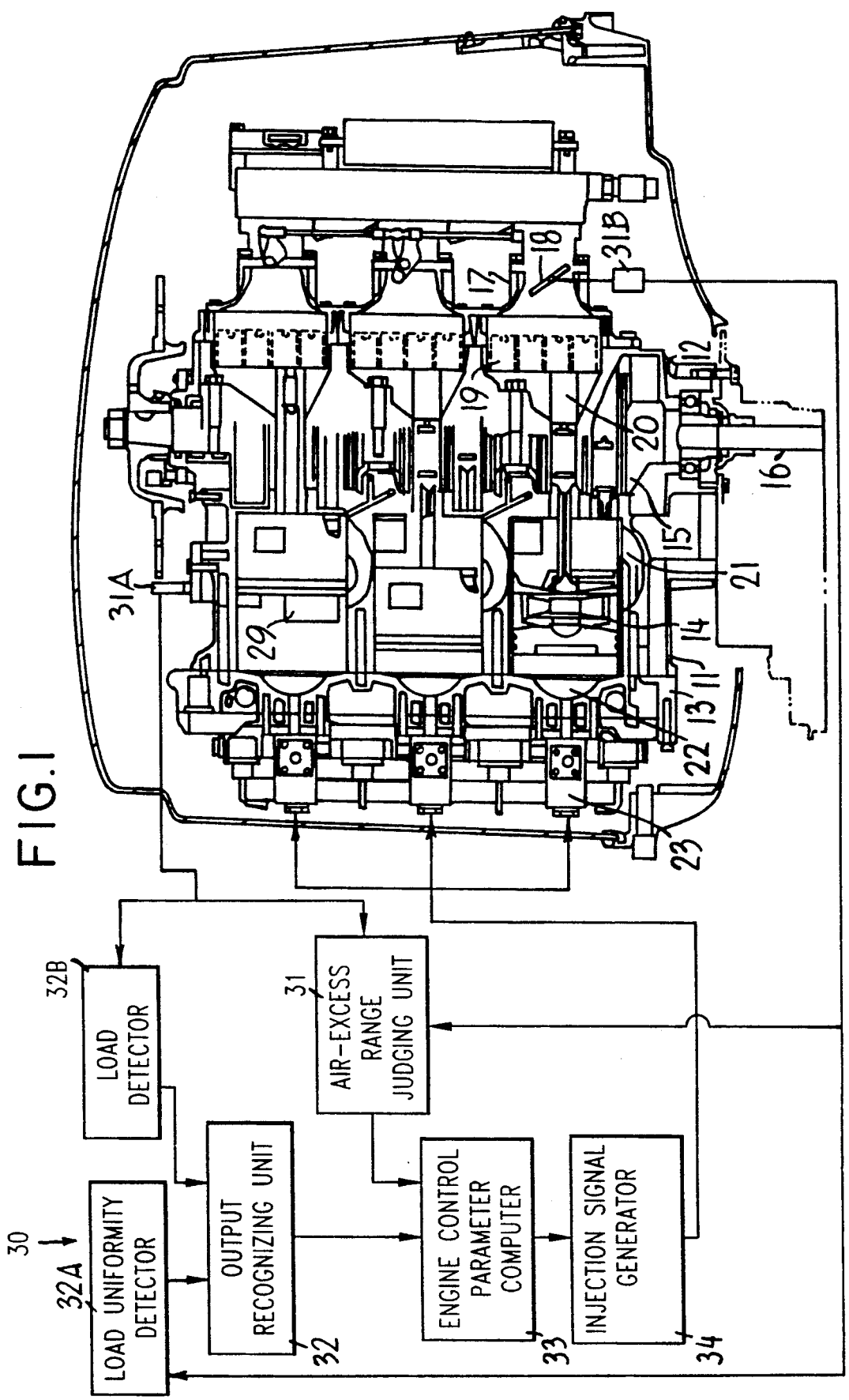
FIG. 1 shows an outboard motor according to a first embodiment of the present invention.
Figure 2:
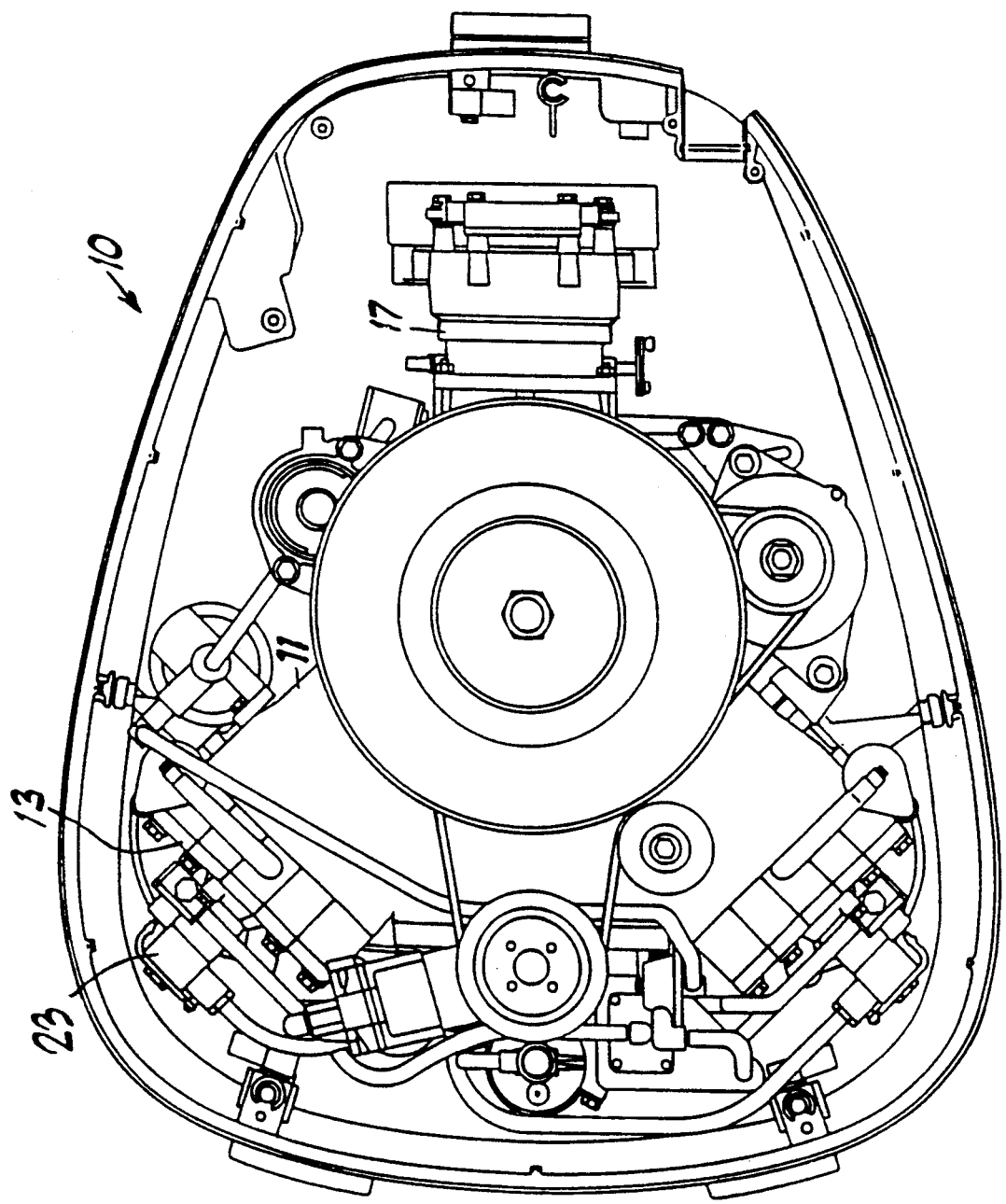
FIG. 2 shows a top view of an engine according to the present invention.

FIGS. 1 and 2 show an engine 10 for an outboard motor according to a first embodiment of the invention. The engine 10 is a 2-cycle engine mounted on the top of the propulsion unit (not shown) and having a cylinder block 11, a crankcase 12, a cylinder head 13, pistons 14, and a crankshaft 15 the lower end portion of which is connected the drive shaft 16 of the propulsion unit.

Figure 3:
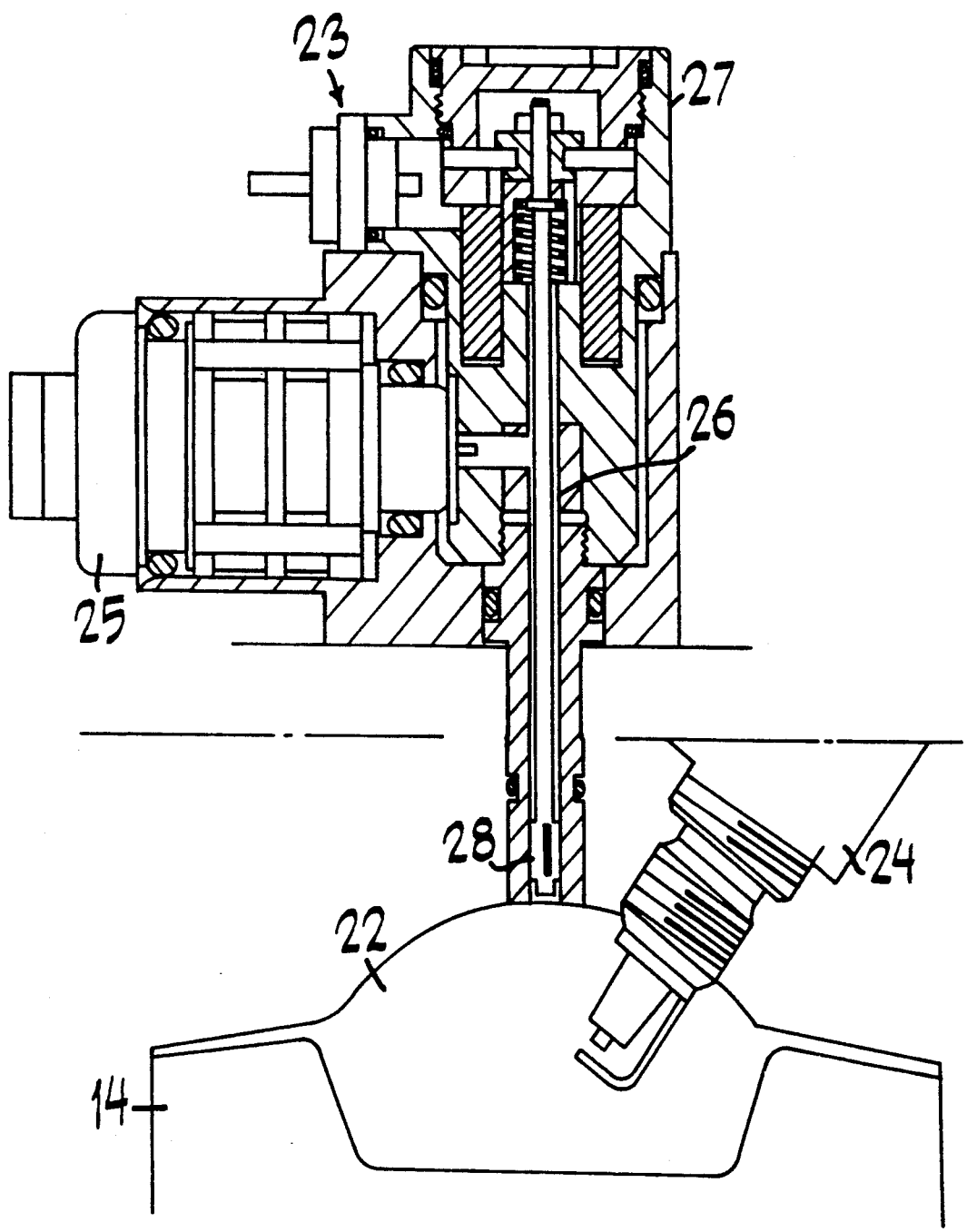
FIG. 3 shows a fuel injector and spark plug arranged in a cylinder of an engine according to the present invention.

In the engine 10, air is taken into the combustion chamber 22 through an intake passage constituted of a throttle valve 18 installed in the intake pipe 17 connected with the crankcase 12, a reed valve 19, crank chamber 20 and a scavenging passage 21, while fuel-air mixture is directly injected into the combustion chamber 22 portion around the ignition plug 24 by an injecting device 23 mounted on the cylinder head 13 (FIG. 3).

Figure 4:
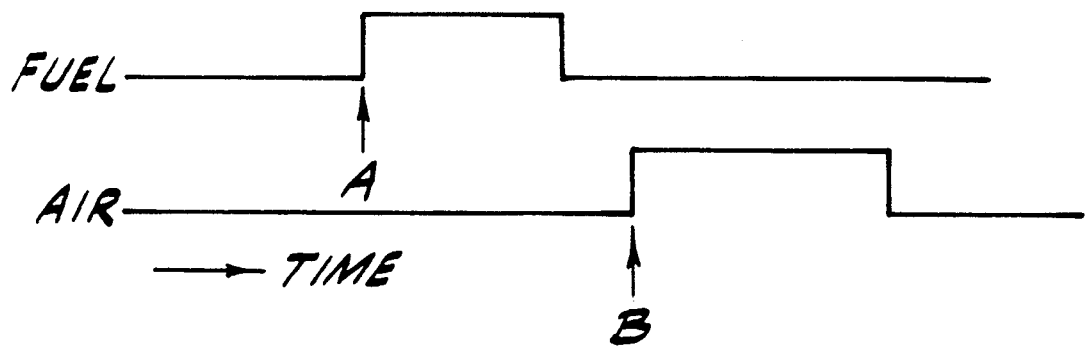
FIG. 4 is a graphic representation of the relative timing of the feeding of fuel to a metering device charged with high pressure air and the subsequent injection of this fuel-air mixture to the cylinder.

The injection device 23 meters fuel fed by a fuel pump (not shown) through a pressure regulator with its metering device 25, and supplies the metered fuel to the metering chamber 26 at the supply starting timing A shown in FIG. 4. The metering chamber 26 is kept supplied with compressed air from an air compressor at a pressure regulated by a pressure regulator, and the fuel supplied in the metering chamber 26 is injected, as fuel-air mixture, into the combustion chamber 22 when the injection valve 28 is opened at the injection starting timing B shown in FIG. 4. The engine 10 is also provided with an exhaust passage 29.

The engine 10 has a fuel injection control system 30 for controlling the injection device 23 composed of an air-excess range judging unit 31, an engine output recognizing unit 32, an engine control parameter computer 33 and an injection signal generator 34 as shown in FIG. 1.

The air-excess range judging unit 31 judges whether or not the amount of air taken in the combustion chamber 22 is in the air-excess range on the basis of the engine revolution speed as represented by the detection signal of a pulser coil 31A installed on the engine 10 around the upper end portion of the crankshaft 15 and the air intake amount based on the opening of throttle valve 18 as represented by the detection signal of the throttle opening detector 31B, or as represented by the detection signal of a crank chamber pressure sensor installed in the crank chamber.

The engine output recognizing unit 32 is incidentally provided with a load uniformity detector 32A which judges that the engine is in the fixed throttle opening state on the basis of the detection signal of the throttle opening detector 31B. The load uniformity detector 32A generates a signal indicating a fixed throttle state whenever the throttle opening is kept fixed for more than a predetermined time.

A load detector 32B detects the engine revolution speed on the basis of the detection signal of the pulser coil 31A while the engine is in the fixed throttle opening state. When the engine is in the fixed throttle opening state, a desired revolution speed is calculated based on the degree to which the throttle is open as represented by the signal from the throttle opening detector 31B.

When the air-excess range judging unit judges that the intake air amount is in the air-excess range, the engine control parameter computer 33 adjusts the fuel injection amount and the injection starting timing so that the desired output recognized by the output recognizing unit may be realized.

More specifically, the memory integrated in the air-excess range judging unit 31 stores a three-dimensional map of data for the air-excess ratios that are optimized in response to the throttle opening angle and the engine speeds detected. Based on this map, the air-excess range judging unit 31 judges, immediately upon receiving the signals for the throttle opening angle and the engine speed, whether the air amount detected is in the excess range. In this particular engine, the air-excess ratios over 1 are applied only for relatively small throttle opening angles at low engine speed operation. The ratios 1 and less are applied for all other conditions.

The injection signal generator 34 delivers an injection valve opening signal with the injection amount and injection starting timing based on the computing results of the engine control parameter computer 33. More specifically, the air intake amount data, which is experimentally determined to correspond to certain throttle openings and engine speeds, is stored in the engine control parameter computer 33. The engine control parameter computer 33 operates on this data, in light the air-excess ratios, to calculate the fuel injection amount. The fuel injection timing, on the other hand, is predetermined in correspondence with the engine speeds. The engine control parameter computer 33 may be such that it adjusts the ignition timing.

The output of engine 10 may be increased by increasing the fuel injection amount increment, or through higher injection speed achieved by the increased pressure difference corresponding to the advanced injection starting timing, or through the more complete combustion associated with the advanced ignition timing.

Figure 5:
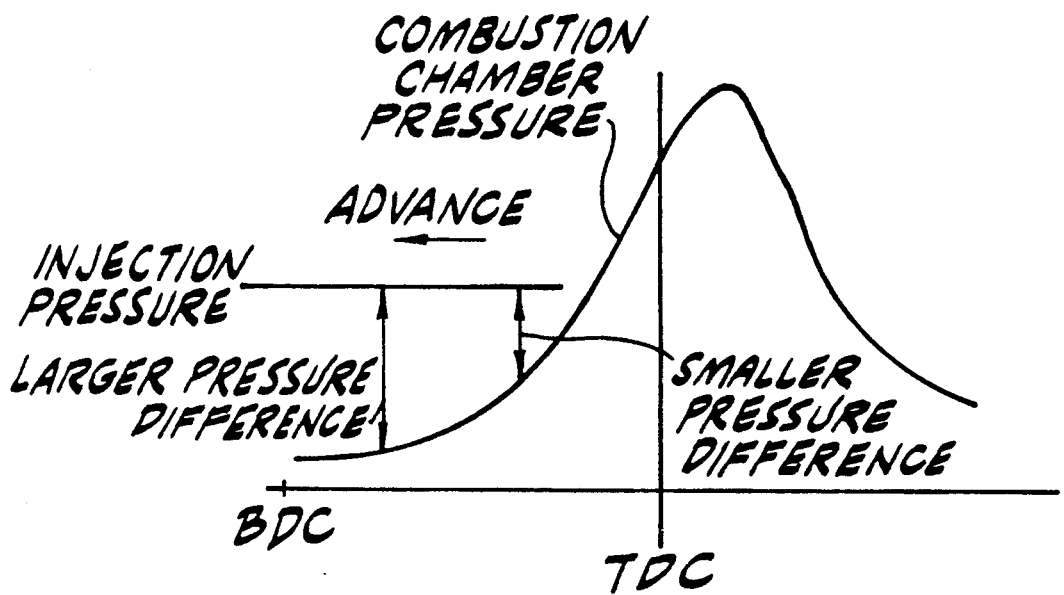
FIG. 5 is a graphic representation of the pressure in a cylinder and the fuel-air mixture injection pressure over time as the piston moves from bottom dead center to top dead center.

In the fuel-air mixture injection type engine 10 according to this invention, the larger the pressure difference between the fuel-air mixture and the combustion chamber interior, the better the fuel atomization and fuel combustion. This, consequently, increases the engine revolution speed. Assuming that the fuel-air mixture pressure is fixed, the lower the combustion chamber pressure, that is, the nearer the injection starting timing is to bottom dead center (the more is advanced the injection starting timing), the larger the pressure difference (see FIG. 5). That is, the output of the engine 10 is increased by advancing the injection starting timing.

In the engine 10, since appropriate fuel-air mixture is fed into the combustion chamber 22 portion around the ignition plug 24 while sufficient excessive air is taken into the combustion chamber 22 to improve fuel consumption and exhaust gas purification, especially under the condition of small throttle opening angle and low engine speed, the combustion chamber 22 interior is in an air-excess state and excessive air remains there even after the completion of fuel combustion.

Figure 7A:
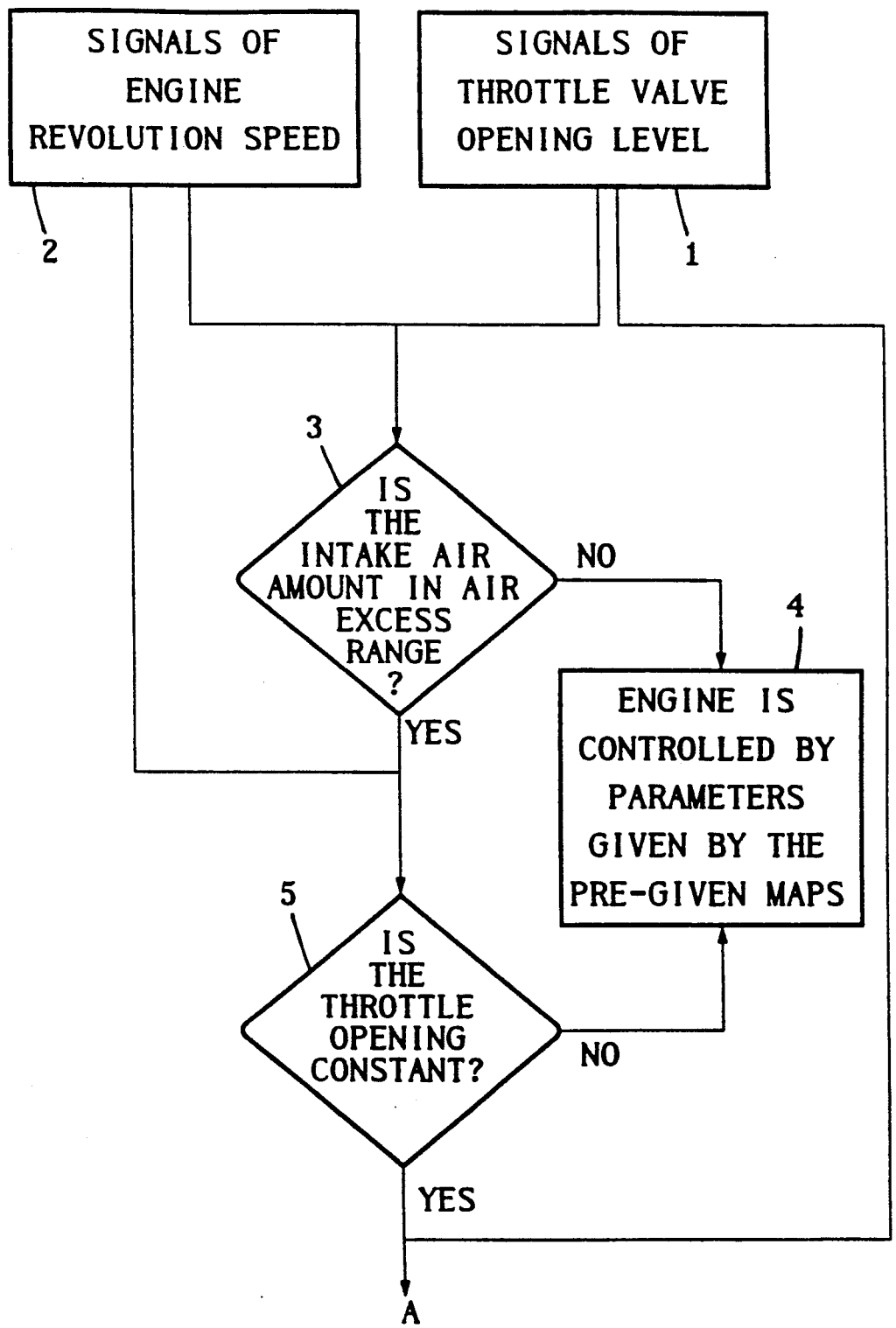
FIGS. 7A and 7B are a flow chart illustrating the operation of the first embodiment of the present invention.
Figure 7B:
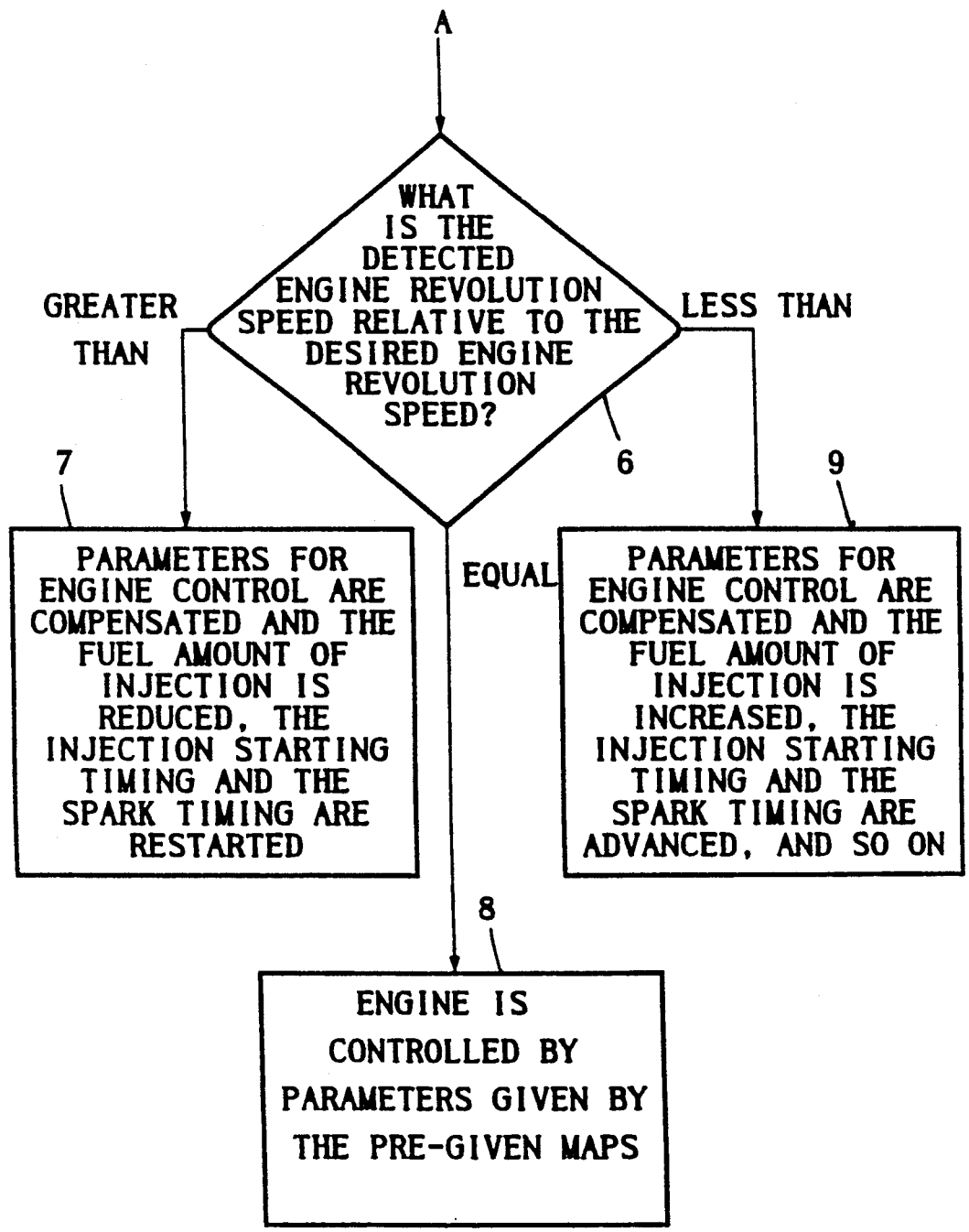

FIGS. 7A and 7B are a flow chart illustrating the operation of an engine control system according to the first embodiment of the invention. The degree to which the throttle valve is open is detected in step 1, and the engine speed of revolution is detected in step 2. In step 3 these values are used to determine whether the amount of intake air is in the air-excess range. If the intake air is not in the air-excess range the engine is controlled by predetermined parameters in step 4. If the intake air is in the air-excess range, the system determines whether or not the degree to which the throttle is open has been constant for a predetermined amount of time in step 5. If the throttle has not been in a constant position for a predetermined amount of time, the engine is controlled by the predetermined parameters in step 4. If the degree to which the throttle is open has been constant for a predetermined time, the system compares the engine speed of revolution with a desired engine speed of revolution based on the degree to which the throttle is open in step 6. When the detected engine speed is greater than the desired engine speed various engine running parameters are modified and the amount of fuel injection is reduced and the injection starting timing and spark timing are retarded in step 7. If the detected engine speed is equal to the desired engine speed, the engine is controlled based on predetermined parameters in step 8. Finally, when the detected engine speed is less than the desired engine speed the amount of fuel injected is increased and the injection starting timing and the spark timing are advanced in step 9.

Therefore, the control system 30 adjusts the engine output by adjusting the fuel injection amount and injection starting timing without adjusting the intake air amount by adjusting the throttle opening or the like, and realizes the fixed throttle opening running at a desired engine output while preventing fluctuation of the engine revolution speed.

That is, the control system 30 stabilizes the engine revolution speed without using actuators for the throttle opening adjustment or the like to realize the desired fixed throttle opening running, as (especially under conditions of small throttle opening angle and low engine speed) the stable running of the engine is not affected by external disturbances such as waves and water level fluctuations.

A second embodiment of the invention has a control system 40 as described hereafter for controlling the injection device 23 in the engine 10 which is the same as the engine in the first embodiment.

The control system 40 is different from the control system 30 of the first embodiment in that the output recognizing unit 32 is provided with an output setting switch 32C in place of the load uniformity detector 32A and the load detector 32B as shown in FIG. 6. The output setting switch 32C recognizes the driver's desired output in response to the driver's manual operation of the output setting switch 32C, and actuates the engine control parameter computer 33 according to this desired output.

The engine output of the engine according to the second embodiment is adjust toward the driver's desired output and the engine revolution speed is stabilized by changing the engine control parameters in the air-excess range without using actuators for adjusting the intake air amount.

The descriptions of the preferred embodiments of the invention are for the purpose of illustrating the invention, and are not to be considered as limiting or restricting the scope of the invention. Many modifications may be made by those skilled in the art without departing from the teachings of the present invention which is intended to be limited only by the appended claims.

What is claimed is:

1. An apparatus for controlling the speed of revolution of a direct fuel injected, scavenged, two-stroke engine, comprising:
    a first sensor for sensing the degree to which the throttle is open;
    means for sensing whether the intake air amount is in the air-excess range;
    means coupled to the first means for sensing whether the degree to which the throttle is open has been substantially constant for a predetermined amount of time;
    a second sensor for sensing the engine revolution speed;
    means for producing a desired engine revolution speed based on the degree to which the throttle is open;
    means coupled to the first, and second sensors and to the means for sensing whether the intake air amount is in the air-excess range, the means for sensing whether the degree to which the throttle is open has been substantially constant for a predetermined amount of time, and the means for producing a desired engine revolution speed, for producing a signal corresponding to the difference between the engine revolution speed and said desired engine speed, when the degree to which the throttle is open has been substantially constant for the predetermined amount of time; and
    a control device for adjusting at least one engine running parameter based on said difference to reduce said difference.

2. An apparatus according to claim 1, wherein said engine running parameter is the fuel injection timing.

3. An apparatus according to claim 2, wherein fuel injection timing is advanced when the engine speed is lower than the desired engine speed, and is delayed when the engine speed is greater than the desired engine speed.

4. An apparatus according to claim 1, wherein said engine running parameter is the amount of fuel injected to the cylinder.

5. An apparatus according to claim 4, wherein the amount of fuel injected to the cylinder is increased when the engine speed is lower than the desired engine speed, and is decreased when the engine speed is greater than the desired engine speed.

6. An apparatus according to claim 1, wherein said engine running parameter is the spark timing.

7. An apparatus according to claim 6, wherein spark timing is advanced when the engine speed is lower than the desired engine speed, and is delayed when the engine speed is greater than the desired engine speed.

8. An apparatus according to claim 1, wherein the second sensor includes a pulser coil.

9. An apparatus according to claim 1, wherein the control device includes an injection timing computer.

10. An apparatus according to claim 1, wherein the control device adjusts the engine running parameter based on said difference and on whether the intake air amount is in the air-excess range.

11. A method for controlling the speed of a direct fuel injected, scavenged, two-stroke engine, comprising the steps of:
    sensing the degree to which the throttle is open;
    sensing the engine speed; and
    determining whether the degree to which the throttle is open has been substantially constant for a predetermined amount of time;
    if the degree to which the throttle is open has not been substantially constant for the predetermined amount of time, controlling the engine based on a predetermined set of parameters corresponding to the degree to which the throttle is open;
    if the degree to which the throttle is open has been substantially constant for the predetermined amount of time, producing a desired engine speed corresponding to the degree to which the throttle is open; and
    adjusting at least one engine running parameter to reduce the difference between the detected engine speed and the desired engine speed.

12. A method according to claim 11, wherein said engine running parameter is the fuel injection timing.

13. A method according to claim 12, wherein the fuel injection timing is advanced when the engine speed is lower than the desired engine speed, and is delayed when the engine speed is greater than the desired engine speed.

14. A method according to claim 11, wherein said engine running parameter is the amount of fuel injected to the cylinder.

15. A method according to claim 14, wherein the amount of fuel injected to the cylinder is increased when the engine speed is lower than the desired engine speed, and is decreased when the engine speed is greater than the desired engine speed.

16. A method according to claim 11, wherein said engine running parameter is the spark timing.

17. A method according to claim 16, wherein spark timing is advanced when the engine speed is lower than the desired engine speed, and is delayed when the engine speed is greater than the desired engine speed.

18. A method according to claim 11, wherein the engine running parameter is adjusted based on said difference and on whether the intake air amount is in the air-excess range.

* * * * *

UNITED STATES PATENT AND TRADEMARK OFFICE
CERTIFICATE OF CORRECTION

PATENT NO. : 5,172,666

DATED : December 22, 1992

INVENTOR(S) : Kimihiro NONAKA

It is certified that error appears in the above-identified patent and that said Letters Patent is hereby corrected as shown below:

Title Page:
ABSTRACT, line 6, change "whcih" to --which--.

ABSTRACT, line 11, change "coresponding" to --corresponding--.

Column 1, line 13, change "rise in fall." to --rise and fall.--.

Column 1, line 58, after "time" insert a comma.

Column 2, line 16, change "a flow chart" to --flow charts--.

Column 2, line 26, after "crankshaft 15" insert a comma.

Column 2, line 27, between "connected" and "the" insert --to--.

Column 2, line 29, change "constituted of" to --consisting of--.

Column 3, line 38, between "light" and "the" insert --of--.

UNITED STATES PATENT AND TRADEMARK OFFICE
CERTIFICATE OF CORRECTION

PATENT NO. : 5,172,666
DATED : December 22, 1992
INVENTOR(S) : Kimihiro Nonaka

It is certified that error appears in the above-indentified patent and that said Letters Patent is hereby corrected as shown below:

Column 4, line 11, after "range" insert a comma.

Column 4, line 24, change "speed various" to --speed, various--.

Column 4, line 31, change "speed the amount" to --speed, the amount--.

Column 4, line 64, change "adjust" to --adjusted--.

Column 5, line 25, change "first, and second sensors"

to --first and second sensors,--.

Signed and Sealed this

First Day of February, 1994

Attest:

BRUCE LEHMAN

*Attesting Officer*  *Commissioner of Patents and Trademarks*